(12) United States Patent
Esam et al.

(10) Patent No.: US 9,882,985 B1
(45) Date of Patent: Jan. 30, 2018

(54) DATA STORAGE PATH OPTIMIZATION FOR INTERNET OF THINGS COMPUTING SYSTEM

(71) Applicant: EMC Corporation, Hopkinton, MA (US)

(72) Inventors: Mohamed Esam, Cairo (EG); Eslam El-Nakib, Cairo (EG); Mohamed Sohail, Sheikh Zaid (EG); Sherief Selim, Giza (EG); Yasmine Morad, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 301 days.

(21) Appl. No.: 14/853,437

(22) Filed: Sep. 14, 2015

(51) Int. Cl.
  *G06F 15/16* (2006.01)
  *H04L 29/08* (2006.01)
  *G06F 17/30* (2006.01)

(52) U.S. Cl.
  CPC .... *H04L 67/1097* (2013.01); *G06F 17/30575* (2013.01); *G06F 17/30873* (2013.01)

(58) Field of Classification Search
  CPC .......... G06F 11/1435; G06F 17/30; G06F 17/30194; G06F 11/2094; G06F 12/00; H04L 63/0263; H04L 63/123
  See application file for complete search history.

(56) References Cited

U.S. PATENT DOCUMENTS

| | | | | |
|---|---|---|---|---|
| 8,850,145 B1* | 9/2014 | Haase | ..................... | G06F 17/30 711/162 |
| 2005/0071508 A1* | 3/2005 | Brown | ..................... | H04L 51/38 709/246 |
| 2008/0270524 A1* | 10/2008 | Gupta | ............... | G06F 17/30194 709/203 |
| 2015/0365473 A1* | 12/2015 | Zuerner | ................ | H04L 67/104 713/168 |
| 2016/0212099 A1* | 7/2016 | Zou | ..................... | H04L 63/0263 |
| 2016/0226732 A1* | 8/2016 | Kim | .................... | H04L 12/2807 |

OTHER PUBLICATIONS gartner.com, "Internet of Things," http://www.gartner.com/it-glossary/internet-of-things/, 2013, 3 pages.

(Continued)

*Primary Examiner* — Shean Tokuta
(74) *Attorney, Agent, or Firm* — Ryan, Mason & Lewis, LLP

(57) ABSTRACT

Systems, methods, and articles of manufacture comprising processor-readable storage media are provided for data storage path processing. For example, in one method, a data block is received from a first device over a communications network, wherein the data block is specified to be sent to a second device located on the communications network. A distributed data storage system is accessed to store the data block in a first datastore associated with the first device, and to store a copy of the data block in a second datastore associated with the second device. A notification message is sent to the second device over the communications network to notify the second device that the data block is stored in the second datastore. The method may be performed by an application server that is implemented in an IoT (Internet of Things) cloud computing system.

19 Claims, 13 Drawing Sheets

500

| | User ID | Device Type | MAC Address | IoT Network ID | VM | Storage Pool | LUN |
|---|---|---|---|---|---|---|---|
| 500-1 | U1 | Mobile | x....1 | M1 | VM1 | P1 | 100 |
| | | Cooker | z....2 | C1 | VM2 | | 101 |
| | | E-Curtains | y....3 | C2 | VM3 | | 102 |
| | | Door | a....4 | D1 | | | 103 |
| 500-2 | U2 | Mobile | b....5 | M2 | VM1 | P2 | 104 |
| | | Laptop | f....6 | L1 | | | 105 |
| | | Cooker | i....7 | C3 | VM2 | | 106 |
| | | Car | e....8 | C4 | VM4 | | 107 |

(56) References Cited

OTHER PUBLICATIONS

IEEE Standards Association, "P2413—Standard for an Architectural Framework for the Internet of Things (IoT)," https://standards.ieee.org/develop/project/2413.html, 2015, 1 page.

gartner.com, "Gartner's 2014 Hype Cycle for Emerging Technologies Maps the Journey to Digital Business," http://www.gartner.com/newsroom/id/2819918, Aug. 11, 2014, 3 pages.

GSM Association, "Understanding the Internet of Things (IoT)," http:/www.gsma.com/connectedliving/wp-content/uploads/2014/08/cl_iot_wp_07_14.pdf, Jul. 2014, 15 pages.

ABI Research, "More Than 30 Billion Devices Will Wirelessly Connect to the Internet of Everything in 2020," https://www.abiresearch.com/press/more-than-30-billion-devices-will-wirelessly-conne/, May 9, 2013, 2 pages.

IDC, "Market in a Minute: Internet of Things," http://www.idc.com/downloads/idc_market_in_a_minute_iot_infographic.pdf, 2014-2020, 2013, 1 page.

cisco.com, "Internet of Things (IoT)," http://www.cisco.com/web/solutions/trends/iot/portfolio.html, Jul. 2015, 2 pages.

ISO/IEC JTC1, "Internet of Things (IoT)," Preliminary Report 2014, http://www.iso.org/iso/internet_of_things_report-jtc1.pdf, 2015, 17 pages.

L. Watkins et al., "A Passive Approach to Rogue Access Point Detection," IEEE Global Telecommunications Conference (GLOBECOM), Nov. 2007, pp. 355-360.

Intel, "Quad-Core Intel Xeon Processor 3200 Series," Document No. 316134-016, http://www.intel.ie/conent/dam/www/public/us/en/documents/specification-updates/xeon-3200-specification-update.pdf, Dec. 2010, 70 pages.

\* cited by examiner

500

| | | 502 | 504 | 506 | 508 | 510 | 512 | 514 |
|---|---|---|---|---|---|---|---|---|
| | | User ID | Device Type | MAC Address | IoT Network ID | VM | Storage Pool | LUN |
| 500-1 | | U1 | Mobile | x....1 | M1 | VM1 | P1 | 100 |
| | | | Cooker | z....2 | C1 | VM2 | | 101 |
| | | | E-Curtains | y....3 | C2 | VM3 | | 102 |
| | | | Door | a....4 | D1 | | | 103 |
| 500-2 | | U2 | Mobile | b....5 | M2 | VM1 | P2 | 104 |
| | | | Laptop | f....6 | L1 | | | 105 |
| | | | Cooker | i....7 | C3 | VM2 | | 106 |
| | | | Car | e....8 | C4 | VM4 | | 107 |

FIG. 5

DATA STORAGE PATH OPTIMIZATION FOR INTERNET OF THINGS COMPUTING SYSTEM

FIELD

The field relates generally to cloud computing systems and, in particular, to data storage path processing techniques for cloud computing systems.

BACKGROUND

The Internet of Things (IoT) is a term that refers to a network computing environment in which physical things such as devices, objects, and other things, etc., are equipped with unique identifiers, network connectivity, and other embedded technologies, which allows such devices, objects, and things to sense, communicate, interact, and send/receive data over one or more communications networks (e.g., Internet, etc.) without requiring human-to-human or human-to computer interaction. For an IoT application, a "thing" may include any object that can be assigned an IP address and have the capability to transfer data over a communications network. For example, a "thing" can be a heart monitoring implant within individual, an animal with a biochip transponder, an automobile with one or more integrated sensors to sense operating conditions of the automobile, etc.

IoT technology is considered to be a key enabler for many emerging and future "smart" applications and, consequently, there is expected to be an exponential increase in the number of network connected devices, objects, and autonomous things, which are connected over a communications network such as the Internet. Current IoT technologies are heavily dependent on the Internet for uploading/downloading data to/from an IoT service provider, as well as transmitting data between network connected IoT devices, objects, and things. In this regard, as the number of network connected IoT devices increases, the Internet will become an increasingly problematic bottleneck for IoT data upload/download for IoT services, which will lead to decreased IoT network performance. Moreover, while IoT service providers typically depend on cloud computing platforms to provide IoT services, the back-end storage systems of cloud computing platforms are not optimized for IoT applications, which can further lead to degraded performance of IoT services.

SUMMARY

One embodiment of the invention includes a method for data storage path processing. A data block is received from a first device over a communications network, wherein the data block is specified to be sent to a second device located on the communications network. A distributed data storage system is accessed to store the data block in a first datastore associated with the first device, and to store a copy of the data block in a second datastore associated with the second device. A notification message is sent to the second device over the communications network to notify the second device that the data block is stored in the second datastore. In another embodiment, the method further includes determining whether a size of the data block received from the first device exceeds a predefined threshold. If the size of the data block is determined to exceed the predefined threshold, the steps of accessing the distributed storage system and sending the notification message are performed. If the size of the data block is determined to not exceed a predefined threshold, then the data block is sent directly to the second device over the communications network.

In one embodiment of the invention, the method is performed by an application server that is implemented in an Internet-of-Things cloud computing system.

Other embodiments of the invention include, without limitation, computing systems and articles of manufacture comprising processor-readable storage media.

BRIEF DESCRIPTION OF THE DRAWINGS

FIG. 5 illustrates a data structure for maintaining registration information of registered users and associated registered devices in a database, according to an embodiment of the invention.

DETAILED DESCRIPTION

Embodiments of the invention will be described herein with reference to systems and methods for optimizing data storage path processing in computing systems, such as IoT computing systems. Embodiments of the invention will be described with reference to illustrative computing systems, data storage systems, and associated servers, computers, memory devices, storage devices, and other processing devices. It is to be appreciated, however, that embodiments of the invention are not restricted to use with the particular illustrative system and device configurations shown.

It is to be understood that the terms "computing system" and "data storage system" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, any type of data storage system, or combination of data storage systems, including, but not limited to storage area network (SAN) systems, direct attached storage (DAS) systems, Hadoop Distributed File System (HDFS), as well as other types of data storage systems comprising clustered or distributed virtual and/or physical infrastructure.

The term "memory" herein refers to any type of computer memory accessed by an application using memory access programming semantics, including, by way of example, dynamic random-access memory (DRAM) and memory-mapped files. Typically, reads or writes to underlying devices are performed by an operating system (OS), not the application. As used herein, the term "storage" refers to any resource that is accessed by the application via input/output (I/O) device semantics, such as read and write system calls. In certain instances, the same physical hardware device is accessed by the application as either memory or as storage.

Figure 1:
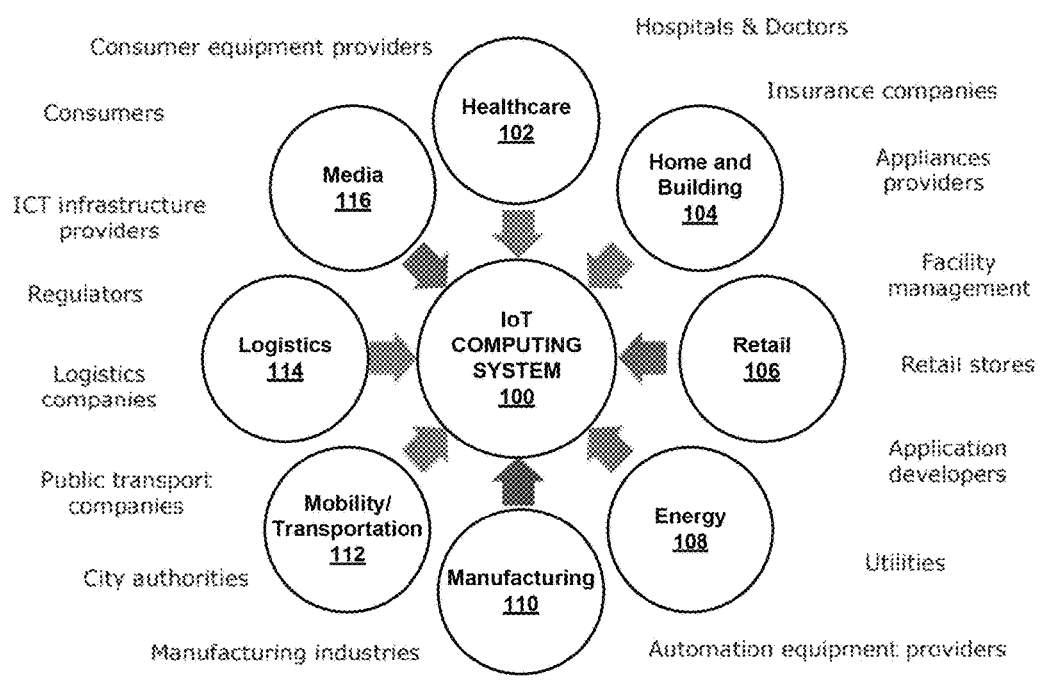
FIG. 1 illustrates an IoT computing system that is configured to support various application domains, according to an embodiment of the invention.

FIG. 1 illustrates an IoT cloud computing system that is configured to support various application domains, according to an embodiment of the invention. In particular, FIG. 1 shows an IoT cloud computing system 100 that can manage and process IoT data received from various IoT devices across various application domains such as healthcare 102, home and building 104, retail 106, energy 108, manufacturing 110, transportation 112, logistics 114, and media 116 domains.

By way of example, for the healthcare domain 102, IoT devices can be utilized for remote health monitoring and emergency notification. Health monitoring devices include blood pressure and heart monitors, pacemakers, hearing aids, etc. Insurance companies can utilize IoT data to automatically track and reconcile insurance claims and ensure proper payments are made to claimants. Furthermore, for the home and building domain 104, IoT devices can be implemented to monitor and control mechanical, electrical and electronic systems that are utilized in residential, commercial or industrial buildings. For example, home and building automation systems can implement IoT devices/sensors to automatically control lighting, heating, ventilation, air conditioning, appliances, communication systems, entertainment and home security devices, etc.

Moreover, for the energy domain 108, IoT sensors and actuators can be implemented, for example, in energy consuming devices (e.g., switches, power outlets, light bulbs, etc.) and be equipped to communicate with power supply companies to provide IoT data that enables the power supply companies to effectively balance power generation and energy usage through "smart grids." For example, IoT devices would enable power supply companies to acquire and process IoT data with regard to energy usage in various regions and automatically control and manage production and distribution of electricity in such regions, e.g., control and manage distribution devices such as transformers. In addition, for the manufacturing domain 110, IoT devices can be used for network control and management of manufacturing equipment or manufacturing process control.

In each of the various application domains, networks of physical objects embedded with electronics, software, sensors, and network connectivity, can be configured to exchange data with control systems or other connected IoT devices over various communications networks. The IoT devices collect useful data using embedded technologies and autonomously send data to other IoT devices. In an embodiment where the IoT computing system 100 supports many application domains, the IoT computing system 100 can acquire and process large amounts of data received from billions of IoT devices at various locations, and be configured to enable cross-domain interaction and platform unification through increased system compatibility, interoperability and functional exchangeability. In this regard, the amount of IoT data that the IoT computing system 100 is expected to acquire and process can exponentially grow over time.

In this regard, embodiments of the invention provide techniques that can be implemented in an IoT cloud computing system to effectively and efficiently index, store, and process large amounts of IoT data in multiple application domains. As explained in further detail below, such techniques include data storage path optimization (SPO) techniques that are configured to decrease the time for uploading large IoT data files through an IoT network and transferring large IoT data files between IoT devices. Such techniques further include user/device registration protocols to acquire and cluster user/device registration information in a way that makes a cloud computing system to be IoT-aware. The user/device registration techniques enable the storage backend in a cloud computing system to be IoT-aware to optimize IoT data handling and enhance IoT cloud computing performance.

Figure 2:
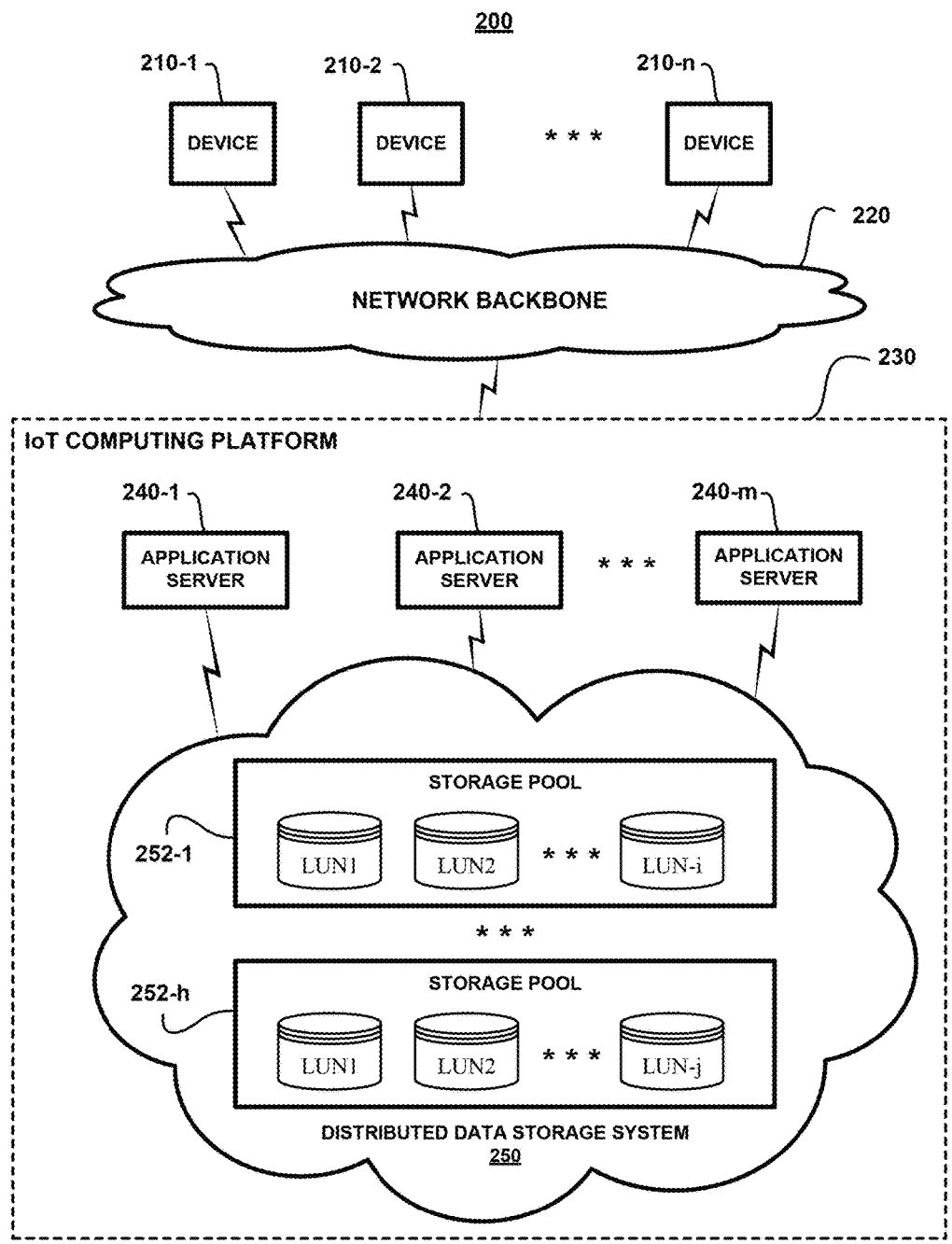
FIG. 2 is a high-level schematic illustration of an IoT computing system that implements storage path optimization methods according to an embodiment of the invention.

FIG. 2 is a high-level schematic illustration of an IoT computing system 200 that implements storage path optimization methods according to an embodiment of the invention. The computing system 200 comprises a plurality of devices 210-1, 210-2, . . . , 210-n (collectively referred to as devices 210), which are connected to a communications network 220. The devices 210 include various types of devices, objects and things such as mobile computing devices, smart phones, RFID devices, smart sensors, smart appliances, and other types of smart devices, objects and things that are configured to support IoT applications for one or more application domains, such discussed above with reference to FIG. 1.

The network 220 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 220 in some embodiments therefore comprises combinations of multiple different types of communications networks each comprising network devices configured to communicate using Internet Protocol (IP) or other related communication protocols. The network 220 comprises intermediate points (such as routers, switches, etc.) and other elements that form a network backbone to establish communication paths and enable communication between network endpoints.

The computing system 200 further comprises an IoT computing platform 230 which is accessible over the communications network 220. The IoT computing platform 230 comprises a plurality of application servers 240-1, 240-2, . . . , 240-m (collectively referred to as application servers 240), and a distributed data storage system 250. The distributed data storage system 250 comprises a plurality of data storage pools 252-1, . . . , 252-h (collectively referred to as data storage pools 252). The data storage pools 252 are logically divided into a plurality of logical number units (LUNs). For example, the data storage pool 252-1 comprises logical number units LUN1, LUN2, . . . , LUN-i, and the data storage pool 252-h comprises logical number units LUN1, LUN2, . . . , LUN-j. One or more of the data storage pools 252 may have the same or a different number of LUNs.

In one embodiment, the IoT computing platform 230 performs data processing and storage functions to support one or more IoT network applications. In particular, the application servers 240 of the IoT computing platform 230 are configured to host and manage one or more IoT applications, which are used by multiple, simultaneously connected users and/or entities in one or more application domains. Depending on the implementation of the IoT computing platform 230, the application servers 240 are configured to, e.g., execute business logic, execute scripts and services to query databases, and perform other computing functions that are needed to host and deliver IoT applications and services to multiple end users, service providers, and/or organizations. In one embodiment of the invention, the application servers 240 and distributed data storage system 250 are implemented using a cluster of servers that reside in a single facility (e.g., data center facility of private company) or a cluster of servers that reside in two or more data center facilities or remote locations (distributed over a cloud network) of a given service provider, for example.

In another embodiment, the application servers 240 and/or other compute nodes of the IoT computing platform 230 include a plurality of virtual machines (VMs) that are implemented using a hypervisor, which execute on one or more of the application servers 240 and/or other compute nodes. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices. An example of a commercially available hypervisor platform that may be used to implement portions of the IoT computing platform 230 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.).

The distributed data storage system 250 is implemented using any type of data storage system, or combination of data storage systems, including, but not limited to a SAN system, a NAS system, HDFS, as well as other types of data storage systems comprising clustered or distributed virtual and/or physical infrastructure. The storage pools 252 comprise groups (e.g., storage arrays) of data storage devices such as HDDs (hard disk drives), Flash storage devices, disk storage devices, SSD (solid state drive) devices, or other types and combinations of non-volatile memory and associated drive types. The data storage pools 252 include homogeneous storage pools, heterogeneous storage pools, or a combination of homogeneous and heterogeneous storage pools. Homogeneous data storage pools have a single drive type (e.g., Flash, HDD, etc.), whereas heterogeneous data storage pools can consist of different drive types.

In one embodiment of the invention, the data storage pools 252 may include up to hundreds of drives (e.g., HDD and/or SSD) to provide a large storage capacity. The data storage pools 252 are logically divided into LUNs, wherein the number of LUNs in the data storage pool can be the same or different. Moreover, the size of the LUNs can be different in different storage pools 252. The LUNs of a given storage pool 252 are presented to the application servers 240 as separately accessible storage disks. The storage pools 252 provide support for automated storage tiering, where faster SSDs can serve as a data cache among a larger group of HDDs, for example.

As noted above, the IoT computing platform 230 can host a multitude of IoT applications across various application domains, wherein the IoT devices 210 associated with these IoT applications can exponentially generate vast amounts of data that needs to be processed, managed, and stored by the IoT computing platform 230. As such, embodiments of the invention provide techniques that are implemented by the IoT computing platform 230 to enable optimization of the indexing, storage and processing of IoT data.

For example, as explained in further detail below, embodiments of the invention include techniques to make storage array controllers in the data storage system 250 to be IoT network aware through a user/device registration process in which registered IoT devices of the same user/entity are assigned to the same storage pool, and wherein IoT devices of the same application type are assigned to the same virtual machine or server. The registration enables an optimal allocation of IoT cloud resources in a way which allows IoT devices of the same user/entity to communicate with minimal delay and which optimizes utilization of virtual machines, thereby optimizing overall performance of the IoT computing platform 230. In addition, as explained in further detail below, embodiments of the invention include storage path optimization techniques that minimize the dependency on the communications network 220 (e.g., Internet) for data upload (uplink) from the devices 210 to the IoT computing platform 230 and transferring IoT data between the network connected devices 210, which serves to minimize data traffic and latency of data uploads over the communications network 220.

Figure 3:
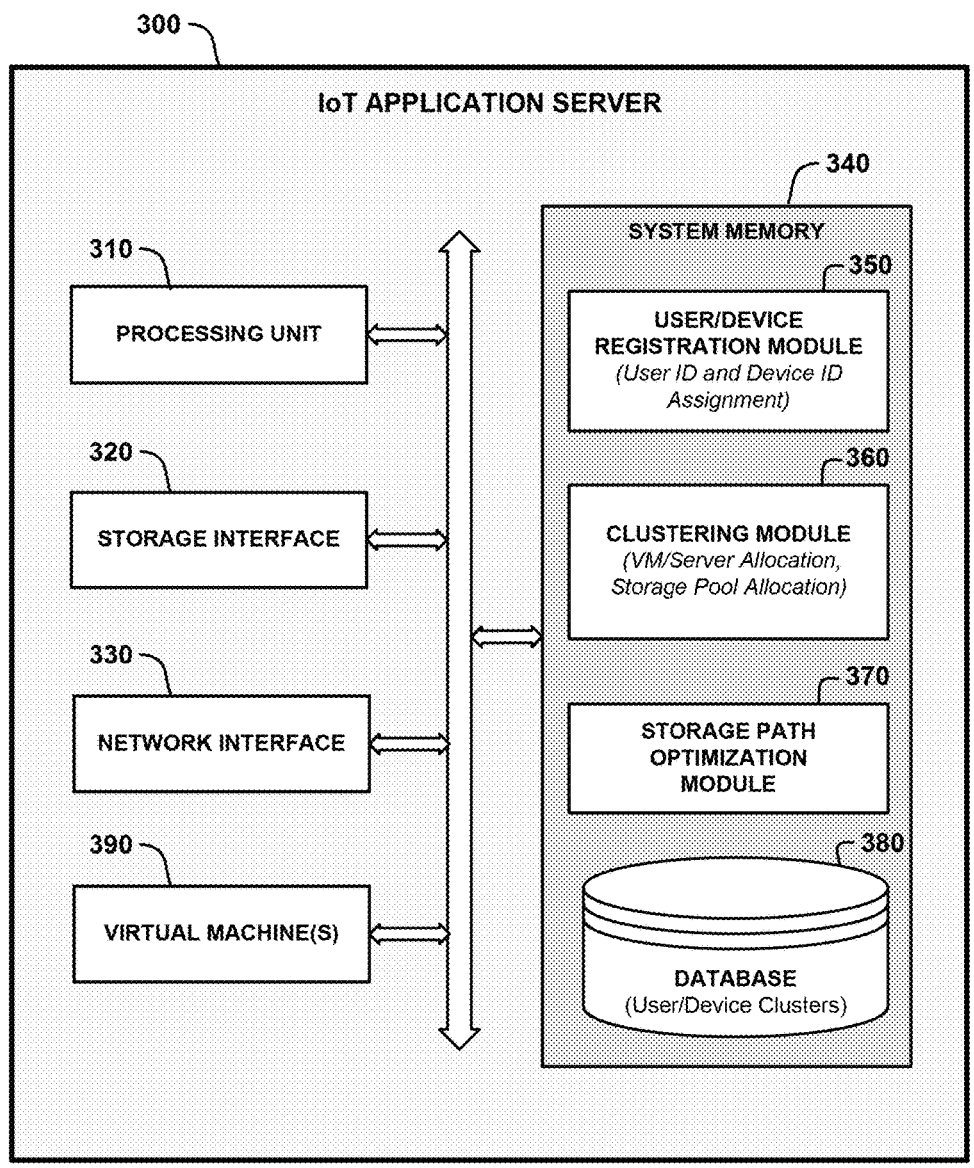
FIG. 3 schematically illustrates an embodiment of an IoT application server which can be implemented in the IoT computing system of FIG. 2, according to an embodiment of the invention.

FIG. 3 schematically illustrates an embodiment of an IoT application server which can be implemented in the computing system of FIG. 2, according to an embodiment of the invention. More specifically, FIG. 3 illustrates an IoT application server 300 which comprises a processing unit 310, storage interface circuitry 320, network interface circuitry 330, and system memory 340. The system memory 340 comprises volatile memory (e.g. DRAM), and one or more levels of non-volatile memory (e.g., NAND), for example, to store program instructions that are executable by the processing unit 310 to implement a registration module 350, a clustering module 360, a storage path optimization module 370, and a database 380. The IoT application server 300 further comprises one or more virtual machines 390 to process IoT data and perform other related functions to support an IoT service. It is to be understood that in one embodiment of the invention, various modules 350, 360, and 370, and the virtual machines 390 may be implemented as software functions that are stored in the system memory 340 and executed by the processing unit 310. In other embodiments, the various modules 350, 360, and 370 and the virtual machines 390 may be implemented using a combination of dedicated hardware and firmware, in addition to software.

The processing unit 310 comprises one or more of a computer processor, a microprocessor, a microcontroller, an application-specific integrated circuit (ASIC), a field programmable gate array (FPGA) or other types of processing circuitry, as well as portions or combinations of such processing circuitry. Indeed, the processing unit 310 may comprise one or more "hardware processors" wherein a hardware process is intended to be broadly construed, so as to encompass all types of processors including, for example, (i) general purpose processors and (ii) optimized processors, which comprise any possible combination of multiple "throughput cores" and/or multiple hardware-based accelerators. Examples of optimized processors include, for example, graphics processing units (GPUs), digital signal processors (DSPs), system-on-chip (SoC), ASICs, FPGAs, and other types of specialized processors or coprocessors that are configured to execute one or more fixed functions.

The storage interface circuitry 320 enables the processing unit 310 to interface and communicate with the system memory 340 and storage pools (e.g., storage pools 252, FIG. 2) of a backend distributed data storage system using one or more standard communication and/or storage control protocols to read, write and otherwise access data in persistent storage devices such as flash memory devices, DAS devices, SAN storage devices, etc., depending on the storage system(s) that are implemented. The network interface circuitry 330 enables the application server 300 to interface and communicate with a network and other system components. The network interface circuitry 330 may comprise conventional transceivers of a type well known in the art (e.g., network interface cards, I/O adaptors, etc.).

The system memory 340 comprises electronic memory such as random access memory (RAM), read-only memory (ROM), or other types of memory, in any combination. The system memory 340 stores one more software programs having instructions that are read and processed by the processing unit 310 to run a native operating system and one or more applications that run on the IoT application server 300. The system memory 340 and other persistent storage elements described herein having program code tangibly embodied thereon are examples of what is more generally referred to herein as "processor-readable storage media" that store executable program code of one or more software programs. Other examples of processor-readable storage media embodying program code include, for example, optical or magnetic storage disks. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The registration module 350 is configured to implement a user interface or Web portal which enables users (e.g., individuals and/or entities such as businesses, organizations etc.) to register with the IoT computing platform 230, and to register various IoT devices associated with the given user for a given IoT application. As explained in further detail below, registration process results in the assignment of unique user IDs to registered users, and device IDs to registered devices. The clustering module 360 is configured by the IoT application server 300 to perform functions such as storage pool allocation and VM (virtual machine)/server allocation with regard to registered users and their associated registered IoT devices. The clustering module 360 is configured to cluster or otherwise compile user and device registration information, together with storage pool and VM/server allocations, into data structures that are maintained in the database 380. In one embodiment of the invention, the registration module 350 and clustering module 360 are configured to implement various methods as will be discussed in further detail below with reference to FIGS. 4 and 5, for example.

The storage path optimization module 370 is configured to utilize information in the database 380 to perform functions such as controlling the upload of data from IoT devices to the IoT computing platform, as well as control the transfer of IoT device data from a source device to a destination device. In one embodiment of the invention, the storage path optimization module 370 is configured to implement various methods as will be discussed in further detail below with reference to FIGS. 6, 7, 8, and 9, for example.

Figure 4:
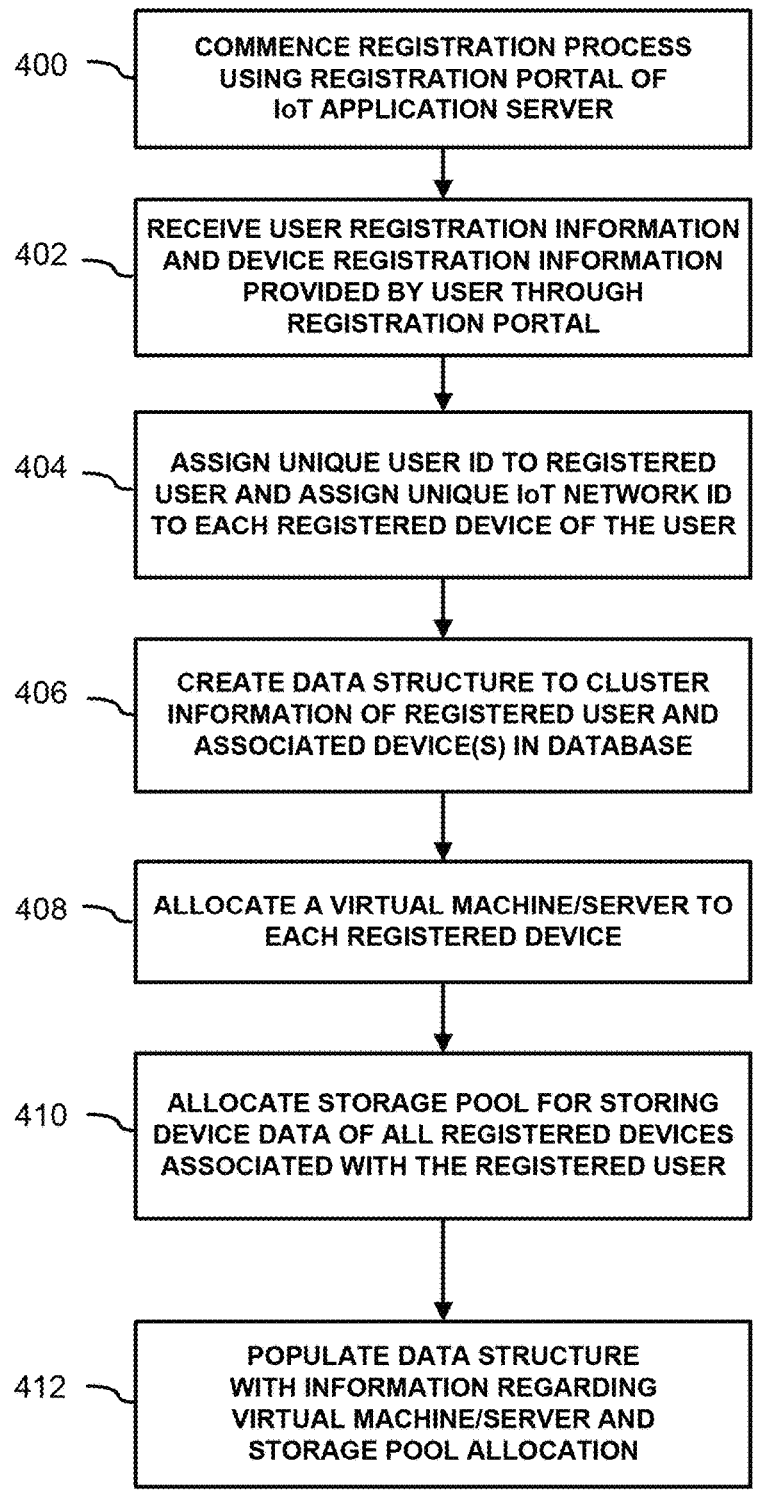
FIG. 4 is a flow diagram of a method for clustering registered user/device information and allocating virtual machines and storage pools to registered users/devices, according to an embodiment of the invention.

FIG. 4 is a flow diagram of a method for clustering registered user/device information and allocating virtual machines and storage pools to registered users/devices, according to an embodiment of the invention. As noted above, in one embodiment of the invention, FIG. 4 illustrates modes of operation of the registration module 350 and clustering module 360 of the IoT application server 300 of FIG. 3. For illustrative purposes, the process flow of FIG. 4 will be discussed with reference to the embodiments of FIGS. 2 and 3. Referring to FIG. 4, a given user (e.g., an individual or entity) wanting to register with the IoT computing platform 230 will commence a registration process using a registration portal (e.g., registration module 350) of an IoT application server (block 400). The IoT application server will receive user registration information and device registration information provided by the user through the registration portal (block 402).

In one embodiment of the invention, the user information comprises, for example, the name of the user, the credentials of the user (e.g., password), contact information, and other user information that is typically obtained when a user establishes an account and registers with an IoT service. Furthermore, in one embodiment of the invention, the device registration information for a given device includes information such as, e.g., device type (e.g., mobile phone, laptop, appliance, etc.) and a unique device ID. For example, the unique device ID can be a MAC (media access control) address associated with the given device. As is known in the art, the MAC address is a unique hardware number of a network interface (e.g., network interface card) which is utilized by a given device for network connectivity. The device registration information may include other types of device information that is typically provided when a user registers a device with an IoT service. The registration process for an IoT service will vary depending on the registration protocol implemented by the IoT computing platform.

The registration process further comprises assigning a unique user ID to the registered user and assigning a unique IoT network ID to each registered device of the registered user (block 404). In one embodiment of the invention, the IoT network ID that is assigned to a given device is based on the MAC address associated with the given device. A data structure for the registered user is then generated to cluster the registration information associated with the user and the associated registered devices of the user, which data structure is maintained in a database (block 406). An example embodiment of a data structure for maintaining registration information of a registered user and associated registered devices in a database (e.g., database 380, FIG. 3) will be discussed below with reference to FIG. 5.

The registration process further comprises allocating a VM or a server to each registered device (block 408). In one embodiment of the invention, all registered devices having the same or similar application type are assigned to the same VM or server. In addition, the registration process comprises allocating, to the registered user, a storage pool 252 in the distributed data storage system 250 to store data of all registered devices associated with the registered user (block 410). The data structure for the registered user is then populated with the VM/server and storage pool allocation information (block 412).

FIG. 5 illustrates a data structure for maintaining registration information of each registered user and associated registered devices in a database, according to an embodiment of the invention. In particular, FIG. 5 illustrates a data structure 500 that is used to persistently store clustered user/device registration information and associated VM/server and storage pool allocation information, which is generated as a result of a registration process. As shown in FIG. 5, the data structure 500 comprises User ID data fields 502, Device Type data fields 504, MAC Address data fields 506, IoT Network ID data fields 508, VM data fields 510, Storage Pool data fields 512, and LUN data fields 514. The data structure 500 comprises a first information cluster 500-1 associated with a first registered user, and a second information cluster 500-2 associated with a second registered user.

The User ID data fields 502 store the unique user IDs of registered users. For example, as shown in FIG. 5, the first information cluster 500-1 is associated with the first registered user having a unique user ID of U1, and the second information cluster 500-2 is associated with the second registered user having a unique user ID of U2. The Device Type data fields 504 store the device type information with regard to the registered IoT devices of the registered users. For example, as shown in FIG. 5, the first registered user U1 has a plurality of registered IoT devices to implement a home automation IoT application (e.g., Cooker, E-Curtains, Door, etc.), for example, using a Mobile device. Moreover, the second registered user U2 has a plurality of registered IoT devices including a Mobile device, a Laptop device, a Cooker device (e.g., a smart cooking appliance) and a Car. The MAC Address data fields 506 store the MAC addresses of the registered IoT devices of the registered users. The IoT network ID data fields 508 store the unique network IDs that are assigned to the registered devices based on, e.g., the MAC addresses of the registered devices.

In addition, the data structure 500 stores the VM and storage pool allocation information for the registered users and associated devices. In particular, the VM data fields 510 identify the VMs (or servers) that are allocated to process data associated with the registered devices. For example, as shown in FIG. 5, for the first registered user U1, a first virtual machine VM1 is assigned to the registered mobile device, a second virtual machine VM2 is assigned to the registered Cooker device, and a third virtual machine VM3 is assigned to the E-Curtains and Door devices. In addition, for the second registered user U2, the first virtual machine VM1 is assigned to the Mobile device and the Laptop device, the second virtual machine VM2 is assigned to the Cooker device, and a fourth virtual machine VM4 is assigned to the Car.

As noted above, in one embodiment of the invention, all registered IoT devices of the same or similar device type, or which are associated with the same or similar type of application, are assigned to the same VM. By way of example, as shown in FIG. 5, the Mobile and Laptop devices of the registered users U1 and U2 (which can be used to control other registered devices) are assigned to the same virtual machine VM1. The Cooker devices of the first and second registered users U1 and U2 are assigned to the same virtual machine VM2. The E-Curtains and Door devices (which are automated home/building devices) of the first registered user U1 are assigned to the third virtual machine VM4. The registered Car device of the second registered user U2 is assigned to a different virtual machine VM4.

As further shown in FIG. 5, the Storage Pool data fields 512 identify the storage pools within the backend data storage system of the IoT computing platform, which are allocated to the registered users to store the data associated with the registered devices of the users. For example, storage pool P1 is assigned to the first registered user U1 and storage pool P2 is assigned to the second registered user U2. The LUN data fields 514 identify the LUN in the given storage pool in which data is stored for a given registered device. For example, the storage pool P1 allocated to the first registered user U1 is logically divided into a plurality of LUNS including LUN 100, LUN 101, LUN 102, and LUN 103. The data associated with the registered Mobile device of registered user U1 is stored in LUN 100 of storage pool P1, etc.

The clustering of information in the data structure 500 of FIG. 5 enables the storage back-end of the cloud computing to be IoT aware, which optimizes data handling and enhances the IoT computing platform performance. An IoT aware cloud computing platform provides a mechanism to associate the networking and storage protocols in a way that minimizes the upload delay in the IoT network from a source device (sender of data) to the IoT cloud provider network and from IoT cloud provider to a destination device (receiver of data), and eliminating redundant upload/download for the same data content.

Figure 6:
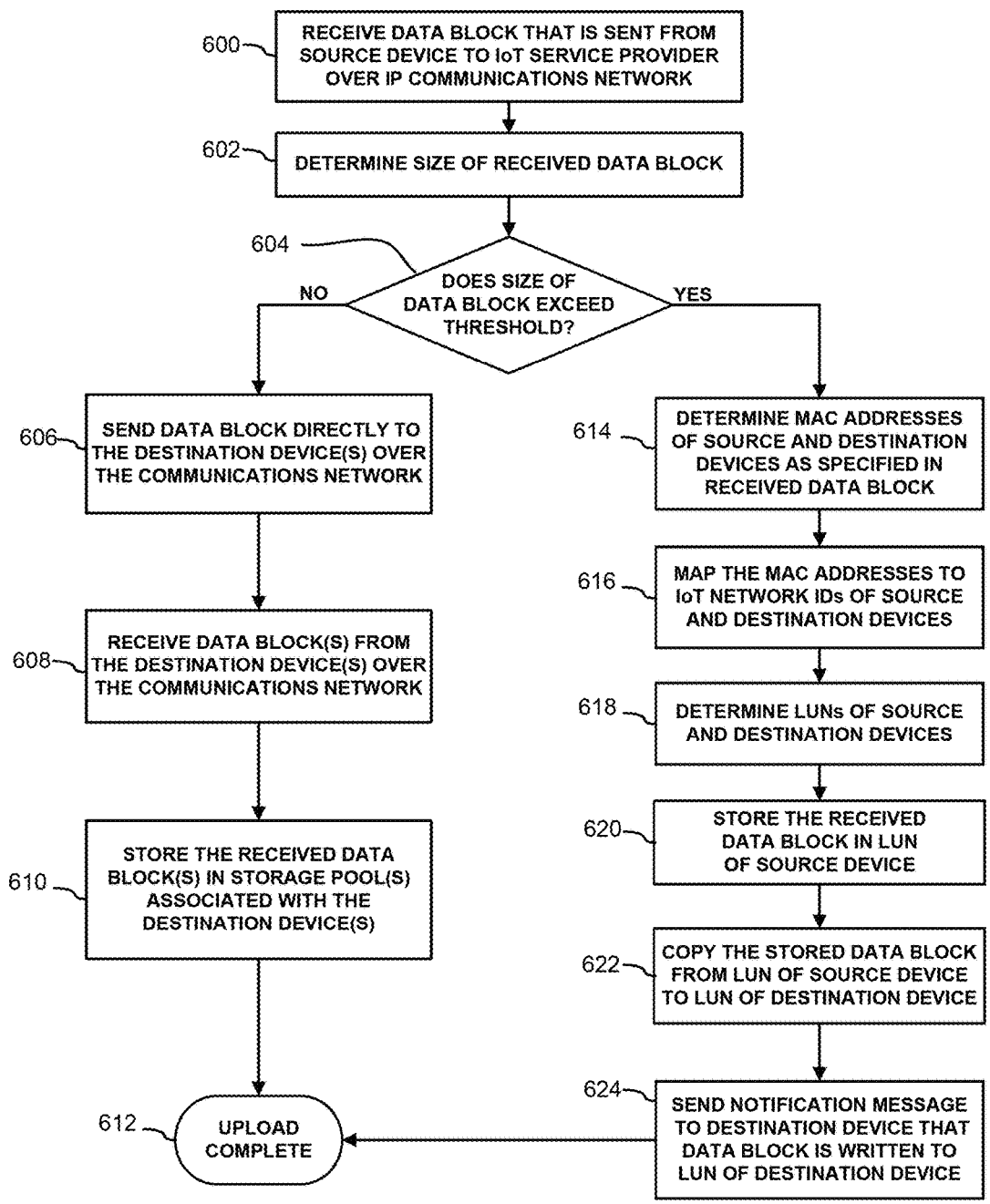
FIG. 6 is a flow diagram of a method for implementing data storage path optimization in an IoT computing platform according to an embodiment of the invention.

FIG. 6 is a flow diagram of a method for implementing storage path optimization in an IoT computing platform according to an embodiment of the invention. As noted above, in one embodiment of the invention, FIG. 6 illustrates operational modes of the storage path optimization module 370 of the IoT application server 300 of FIG. 3. For illustrative purposes, the process flow of FIG. 6 will be discussed with reference to the embodiments of FIGS. 2 and 3. Referring to FIG. 6, an IoT application server of the IoT computing platform 230 receives a data block (e.g., data file) that is sent from a source device over the communications network 220 using an IoT application executing on the source device 210 (block 600). The received data block is specified to be sent to one or more destination devices located on the communications network 220. The IoT application server will determine a size of the received data block (block 602) and compare the determined data block size to a predefined threshold. The predefined threshold will vary depending on the IoT server provider. For example, in one embodiment of the invention, the predefined threshold is 10 Kbytes.

Next, the storage path processing for uploading the received data block to the destination device(s) will depend on whether the size of the received data block either exceeds or does not exceed the predefined threshold. For example, in one embodiment of the invention, if the size of the data block does not exceed the predefined threshold (negative determination in block 604), the IoT application server will send the data block to the destination device(s) over the communications network (block 606). The destination device(s) will then send the data block to the IoT computing platform via the communications network. When the IoT application server receives the data block from a given destination device (block 608), the IoT application server will access the back-end distributed data storage system 250 and store the received data block in a storage pool assigned to the registered user of the destination device (block 610). At this point, the data upload process is deemed complete (block 612).

On the other hand, if the size of the received data block does exceed the predefined threshold (affirmative determination in block 604), the IoT application server will access the distributed data storage system 250 and initiate a process which comprises (i) storing the data block in a datastore associated with the source device, (ii) storing a copy of the data block in a datastore associated with a destination device, and (iii) sending a notification message to the destination device over the communications network to notify the destination device that the data block is stored in the datastore.

More specifically, in one embodiment of the invention shown in FIG. 6, if the size of the received data block does exceed the predefined threshold (affirmative determination in block 604), the IoT application server will proceed to determine the MAC addresses of the source and destination devices, which are specified in the received data block (block 614). The IoT application server will then determine the IoT network IDs of the source and destination devices by mapping the MAC addresses to the IoT network IDs of the registered devices as specified in the user/device cluster data structures stored in the registration database (block 616). For example, as discussed above with reference to the example data structure 500 of FIG. 5, the MAC addresses 506 of registered IoT devices 504 are mapped to IoT network IDs 508 that are assigned to the registered IoT devices 504. This steps allows the IoT application server to confirm that the MAC addresses specified in the received data block are mapped to registered devices.

Next, the IoT application server will utilize the IoT network IDs to determine the LUNs of the storage pools which are allocated to the source and destination devices (block 618). For example, in one embodiment of the invention, the associated LUNs are determined by mapping the IoT network IDs of the source and destination address to the assigned LUNs as specified in the user/device cluster data structures stored in the registration database. The received data block is then stored in the LUN assigned to the source device (block 620). A copy of the stored data block is written to the LUN(s) assigned to the destination device(s) (block 622). With this process, the copy of the stored data block is transmitted over the back-end storage network (e.g., SAN) from one LUN to another LUN (which may or may not be in the same storage pool), as opposed to the IP communications network. A notification message is then sent the destination device(s) over the IP communications network to alert the destination device(s) that the data block from the source device is written to the LUN of the destination device(s) and available for access (block 624). After the notification message is sent, the data upload is deemed to be complete (block 612).

For large size data blocks, the above process (blocks 614-624) utilizes IoT network IDs of the source device and destination device(s), and the storage allocation matrix from the IoT application server to move the data block between the source and destination LUNs without having to transmit the data block directly to the destination devices(s) over the IP communications network (e.g., Internet). This serves to minimize the dependency the IP communications network for data upload in IoT applications for large data files. As will be demonstrated in further detail below, the improvement achieved with such process, in reducing the total delay, increases with large data sizes being transferred in the IoT network.

Figure 7:
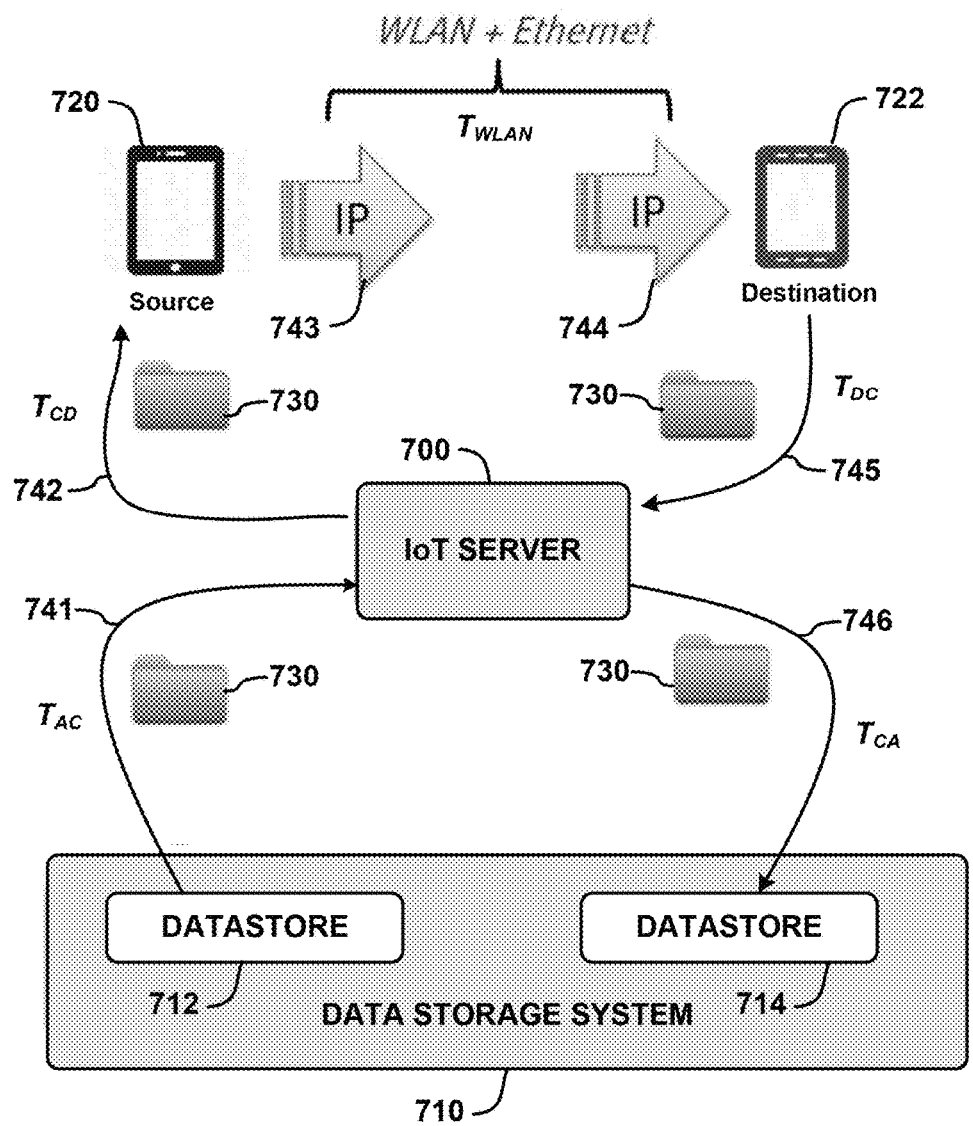
FIG. 7 schematically illustrates a method for sending a data file from a source device to a destination device when a size of the data file does not exceed a predefined threshold, according to an embodiment of the invention.
Figure 8:
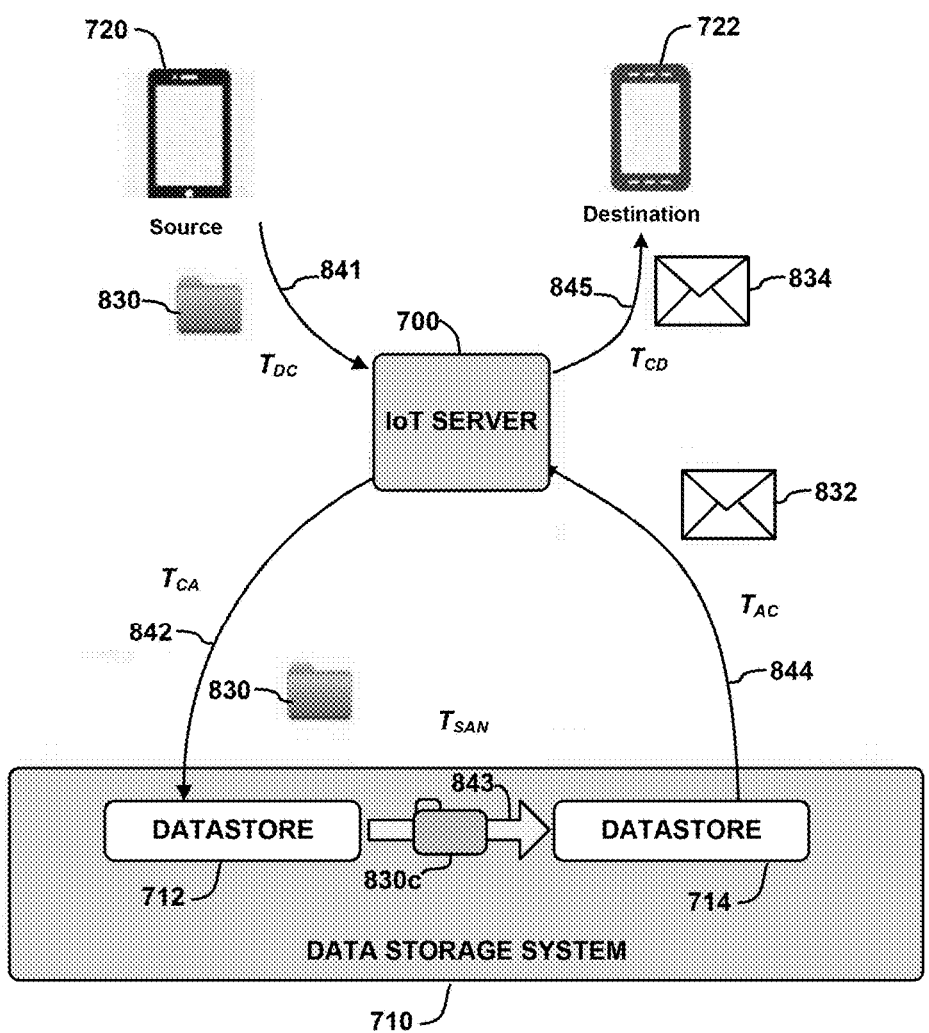
FIG. 8 schematically illustrates a method for uploading a data file from a source device to a destination device when a size of the data file exceeds a predefined threshold, according to an embodiment of the invention.
Figure 9:
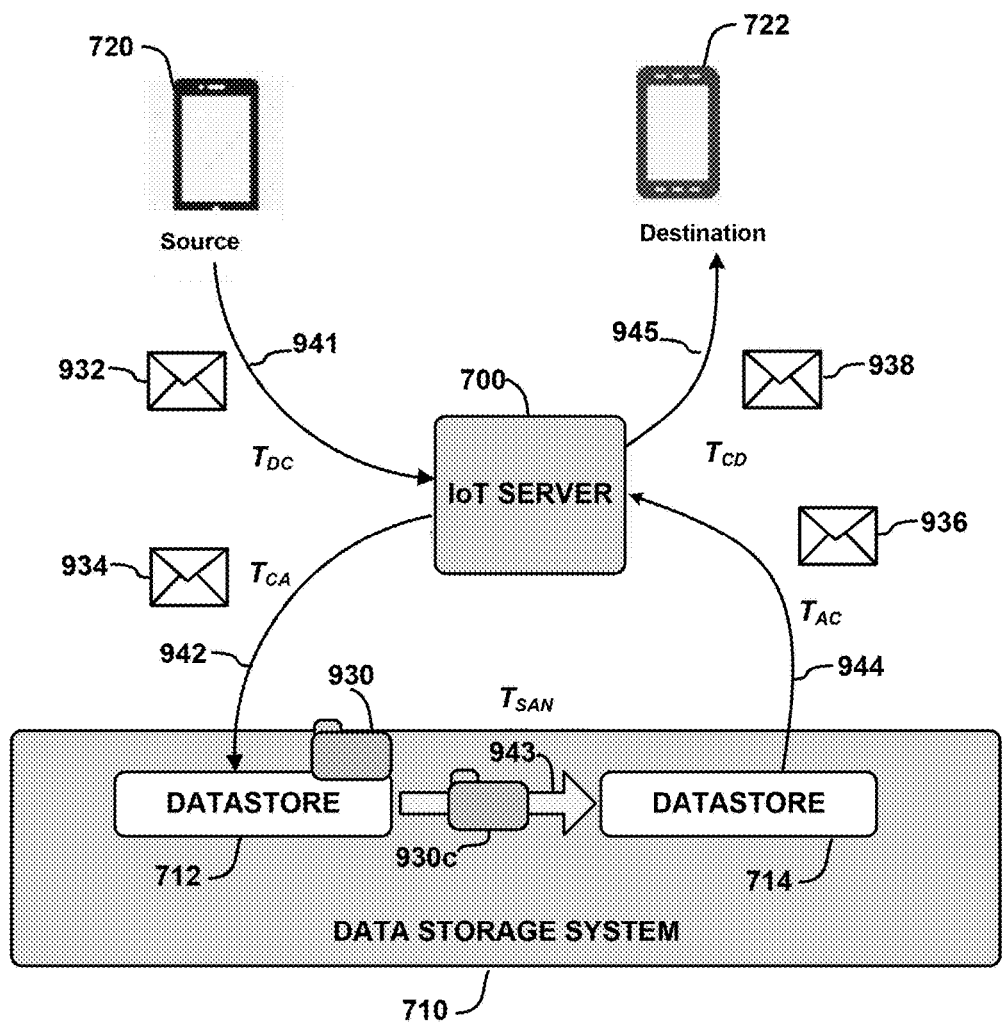
FIG. 9 schematically illustrates a method for uploading a data file from a source device to one or more destination devices when a size of the data file exceeds a predefined threshold, according to another embodiment of the invention.

FIGS. 7, 8, and 9 schematically illustrate different methods for uploading IoT data from a source device to one or more destination devices based on the method of FIG. 6. In particular, FIG. 7 depicts an IoT application server 700 and a distributed data storage system 710 comprising a first datastore 712 and a second datastore 714 (e.g., storage pools). FIG. 7 schematically illustrates a method for sending a data file 730 (or more generally, data block) from a source device 720 to a destination device 722 when a size of the data file 730 does not exceed a predefined threshold. In the example of FIG. 7, it is assumed that the data file 730 is stored in the first datastore 712 which is associated with the source device 720, and that the source device 720 sends a request to the IoT application server 700 to send the data file 730 to the destination device 722.

As an initial step, the IoT application server 700 accesses the data file 730 from the first datastore 712 of the back-end data storage system 710, wherein the data file 730 is transmitted from the first datastore 712 to the IoT application server 700 over a data storage network link 741. The IoT application server 700 then transmits the data file 730 to the source device 720 via a network link 742 over an IP communications network. The source device 720 then sends the data file 730 to the destination device 722 over one or more IP communication network links 743, 744 (e.g., WLAN and Ethernet). After receiving and processing the data file 730, the destination device 722 transmits the data file 730 to the IoT application server 700 via a network link 745 over the IP communications network. The IoT application server 700 then sends the data file 730 to the backend data storage system 710 via a data storage network link 746 to store the data file 730 in the datastore 714 associated with the destination device 722.

In the example of FIG. 7, the time to send ($T_{SEND}$) the data file 730 from the datastore 712 to the destination device 722 is $T_{SEND}=T_{AC}+T_{CD}+T_{WLAN}$, wherein: (i) $T_{AC}$ denotes the time to send the data file 730 from the datastore 712 to the IoT application server 700; (ii) $T_{CD}$ denotes the time to send the data file 730 from the IoT application server 700 to the source device 720; and (iii) $T_{WLAN}$ denotes the time to send the data file 730 from the source device 720 to the destination device 722 over one or more IP networks (e.g., WLAN).

In addition, the time for the data storage system 710 to receive ($T_{RECEIVE}$) the data file 730 from the destination device 722 is $T_{RECEIVE}=T_{DC}+T_{CA}$, wherein: (i) $T_{DC}$ denotes the time to send the data file 730 from the destination device 722 to the IoT application server 700; and (ii) $T_{CA}$ denotes the time to send the data file 730 from the data IoT application server 700 to the datastore 714 associated with the destination device 722.

The time variables $T_{AC}$, $T_{CD}$, $T_{WLAN}$, $T_{DC}$, and $T_{CA}$ are a function of the size of the data file as follows: $T=T_{fixed}+Size_F*T_{transmission}$, wherein $T_{fixed}$ denotes a sum total of fixed time components such as propagation time, processing time, etc., wherein $T_{transmission}$ denotes a link speed, and wherein $Size_F$ denote a data file size. In this regard, as the size of the data file $Size_F$ increases, the time variables $T_{AC}$, $T_{CD}$, $T_{WLAN}$, $T_{DC}$, and $T_{CA}$ increase, which increases the upload time for sending the data file from the source device to the destination device.

As noted above, embodiments of the invention enable optimization of storage path processing in an IoT computing platform by minimizing the upload time for sending data from a source device to a destination device based on the data file size $Size_F$. Indeed, as noted above with reference to FIG. 6, for large data files, a small header file (e.g., notification message) is transmitted over the communications network to a destination device instead of the large data file. Instead, the large data files are transmitted from source LUNs to destinations LUNs in the backend data storage network (e.g., SAN) and accessed by the destination devices upon request. The size of the header file (denoted $Size_H$) is much smaller than the size of the data file, i.e., $Size_H \ll Size_F$, which serves to minimize the data upload time.

For example, FIG. 8 schematically illustrates a method for sending a data file 830 from the source device 720 to the destination device 722 when a size of the data file 830 exceeds a predefined threshold, according to an embodiment of the invention. In the example of FIG. 8, the source device 720 sends the data file 830 to the IoT application server 700 via an IP communications network link 841. The IoT application server 700 determines that the size of the data file 830 exceeds the predefined threshold, and then accesses the backend data storage system 710 to store the date file 830 in the datastore 712 associated with the source device 720. The data file 830 is transmitted from the IoT application server 700 to the datastore 712 via a data storage network link 842. A copy 830c of the stored data file 830 in the datastore 712 is then written to the datastore 714 associated with the destination device 722. The data file copy 830c is transmitted to the datastore 714 via a data storage network link 843.

Next, the data storage system 710 sends a notification message 832 to the IoT application server 700 via a data storage network link 844 indicating that the data storage operation is complete, and the IoT application server 700 sends a notification message 834 to the destination device 722 via an IP communications network link 845. The notification message 834 notifies the destination device 722 that the data file 830 is available for access. In this embodiment, the upload process is deemed complete when the destination device 722 receives and acknowledges the notification message 834.

FIG. 9 schematically illustrates a method for sending a data file from a source device to a destination device when a size of the data file exceeds a predefined threshold, according to another embodiment of the invention. More specifically, FIG. 9 illustrates an embodiment in which a large size data file 930 of the source device 720, which is already stored in the associated datastore 712, is requested to be sent to the destination device 722. In this embodiment, the source device 720 sends a request message 932 to the IoT application server 700 to have the data file 930 sent to the destination device 722. The request message 932 is transmitted to the IoT application server 700 via an IP communications network link 941. The IoT application server 700 sends a corresponding request message 934 to the data storage system 710 to request that a copy of the stored data file 930 be written to the datastore 714 associated with the destination device 722. The request message 934 is transmitted to the data storage system 710 via a data storage network link 942.

In response to the request message 934, a copy 930c of the stored data file 930 in the datastore 712 is written to the datastore 714 associated with the destination device 722. The data file copy 930c is transmitted to the datastore 714 via a data storage network link 943. The data storage system 710 sends a notification message 936 to the IoT application server 700 via a data storage network link 944 indicating that the data storage operation is complete, and the IoT application server 700 sends a notification message 938 to the destination device 722 via an IP communications network link 945. The notification message 938 notifies the destination device 722 that the data file 930 is available for access in the datastore 714 associated with the destination device 722. In this embodiment, the upload process is deemed complete when the destination device 722 receives and acknowledges the notification message 938. The process of FIG. 9 can be repeated to store a copy of the data file 930 in other datastores associated with other destination devices, at the request of the source device 720.

In the example embodiments of FIGS. 8 and 9, the notification messages 832, 834, 936, and 938 and the request messages 932, 934 are small files/headers with a size ($Size_H$) of a few KBs or less, which effectively decreases the time for uploading data files to destination devices. For example, in the embodiment of FIG. 8, the time to send ($T_{SEND}$) the data file 830 from the source device to the datastore 714 of the destination device is $T_{SEND}=T_{DC}+T_{CA}+T_{SAN}$, wherein: (i) $T_{DC}$ denotes the time to send the data file 830 from the source device 720 to the IoT application server 700; (ii) $T_{CA}$ denotes the time to send the data file 830 from the IoT application server 700 to the datastore 712 associated with the source device 720; and (iii) $T_{SAN}$ denotes the time to send a copy of the data file 830c from the source datastore 712 to the destination datastore 714 over the data storage network link 843 (e.g., SAN link).

In addition, the time for the destination device 722 to receive ($T_{RECEIVE}$) the notification message 834 that the data file 830 is ready for access is $T_{RECEIVE}=T_{AC}+T_{CD}$, wherein: (i) $T_{AC}$ denotes the time to send the notification message 832 from the data storage system 710 to the IoT application server 700; and (ii) TCD denotes the time to send the notification message 834 from the IoT application server to the destination device 722.

Similarly, in the embodiment of FIG. 9, the time to send ($T_{SEND}$) the data file copy 930c to the datastore 714 of the destination device is $T_{SEND}=T_{DC}+T_{CA}+T_{SAN}$, wherein: (i) $T_{DC}$ denotes the time to send the request message 932 from the source device 720 to the IoT application server 700; (ii) $T_{CA}$ denotes the time to send the request message 934 from the data IoT application server 700 to the datastore 712 associated with the source device 720; and (iii) $T_{SAN}$ denotes the time to send a copy of the data file 930c from the source datastore 712 to the destination datastore 714 over the data storage network link 943 (e.g., SAN link).

In addition, the time for the destination device 722 to receive ($T_{RECEIVE}$) the notification message 938 that the data file 930 is ready for access is $T_{RECEIVE}=T_{AC}+T_{CD}$, wherein: (i) TAC denotes the time to send the notification message 936 from the data storage system 710 to the IoT application server 700; and (ii) $T_{CD}$ denotes the time to send the notification message 938 from the IoT application server to the destination device 722.

In the embodiments of FIGS. 8 and 9, the time variables $T_{DC}$, $T_{CA}$, and $T_{SAN}$ are a function of the size ($Size_F$) of the data file 930 as follows: $T=T_{fixed}+Size_F*T_{transmission}$, whereas the time variables $T_{AC}$ and $T_{CD}$ are a function of the header file size ($Size_H$) of the notification message 932 as follows: $T=T_{fixed}+Size_H*T_{transmission}$. The variable $T_{fixed}$ denotes a sum total of fixed time components such as propagation time, processing time, etc., and the variable $T_{transmission}$ denotes a link speed.

In this regard, as compared to sending large data files of size $Size_F$, transmission of small notification messages (e.g., header files of size $Size_H \ll Size_F$) in the embodiments of FIGS. 8 and 9 minimizes the variables $T_{AC}$ and $T_{CD}$ in FIG. 8, and minimizes the variables $T_{DC}$, $T_{CA}$, $T_{AC}$, and $T_{CD}$ in FIG. 9, as such, the overall upload time in FIGS. 8 and 9 is reduced due to the shorter time to transmit small sized messages ($Size_H \ll Size_F$) between the IoT devices 720/722 and the IoT application server 700, and between the IoT application server 700 and the data storage system 710. In addition, the time ($T_{SAN}$) for storing a copy of a data file from a source datastore to a destination datastore over a data storage network (e.g., SAN) is less than the time it takes for transmitting the data file from the source device to the destination device over an IP communications network (e.g., WLAN). Indeed, a SAN is faster than a WLAN and is suited for sending large data files.

In the example embodiments of FIGS. 8 and 9, the time improvement (i.e., decrease in upload time) is proportional to $Size_F$ and a number N of destination devices to which a given data file is uploaded from a source device. In particular, the time improvement can be determined as follows: Time_Improvement=$[(T_{CA}+T_{DC})*(Size_F-Size_H)+(T_{WLAN}-T_{SAN})]*(N-1)$, wherein N is the number of destination devices to which the data file of size $Size_F$ is uploaded.

Figure 10:
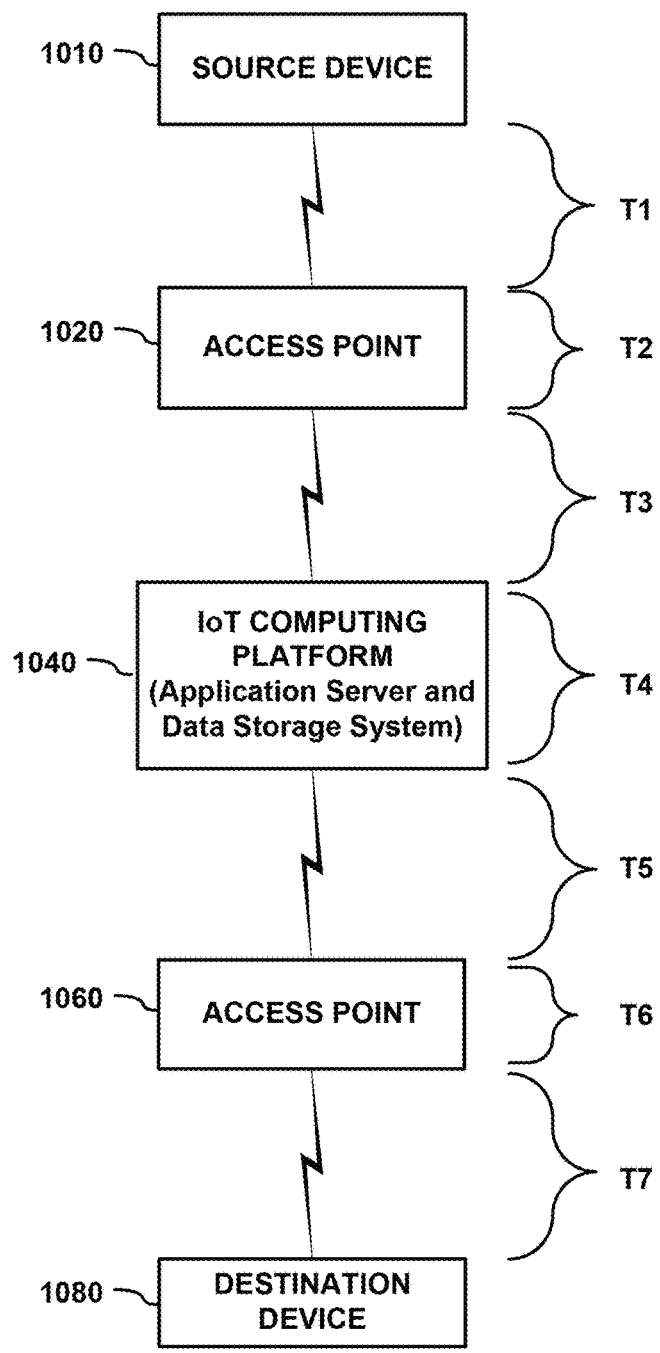
FIG. 10 illustrates a framework of an IoT network that was modeled to perform computer simulations.

Computer simulations were performed using MATLAB to compare the performance of storage path optimization (SPO) processes according to embodiments of the invention with the performance of a conventional process of sending large data files between IoT devices, wherein the performance comparison was considered in terms of the improvement in the upload delay (in seconds), i.e., decrease in upload time. A MATLAB model was built to simulate an IoT network such as shown in FIG. 10. In particular, FIG. 10 illustrates a framework of an IoT network 1000 that was modeled for performing computer simulations. The IoT network 1000 comprises a source device 1010, a first access point 1020, an IoT computing platform 1040 comprising an IoT application server and data storage system, a second access point 1060, and a destination device 1080. In FIG. 10, the first and second access points 1020 and 1060 represent devices that allow wireless devices (e.g., source and destination devices 1010 and 1080) to connect to a wired network (e.g., Internet) using Wi-Fi, or other related wireless standards. The first and second access points 1020 and 1060 may be part of a router that is connected to a wired network.

FIG. 10 further shows various time variables T1~T7. The time variable T1 denotes a propagation time for wirelessly sending data from the source device 1010 to the first access point 1020. The time variable T2 denotes a data transmission time for processing data through the first access point 1020. The time variable T3 denotes a propagation time for sending data from the first access point 1020 to the IoT computing platform 1040. The time variable T4 denotes the time for processing data in the IoT computing platform 1040. The time variable T5 denotes the propagation time for sending data from the IoT computing platform 1040 to the second access point 1060. The time variable T6 time denotes a data transmission time for processing data through the second access point 1060. The time variable T7 denotes a propagation time for wirelessly sending data from the second access point 1060 to the destination device 1080.

For the computer simulations performed using MATLAB based on the IoT network model of FIG. 10, the time variables T1~T7 consisted of different time components depending on different test cases that were defined. For example, for the computer simulations, the following testing cases were implemented:

(i) Test Case 1—1 sender, 1 receiver, 1 frame;
(ii) Test Case 2—1 sender, 1 receiver, M frames (Transmission Control Protocol (TCP));
(iii) Test Case 3—1 sender, 1 receiver, M frames (User Datagram Protocol (UDP);
(iv) Test Case 4—1 sender, M receivers, N frames (TCP); and
(v) Test Case 5—1 sender, M receivers, N frames (UDP).

Furthermore, the different test cases were implemented based on the following IoT network test environment and parameters. The wireless communications between the source device 1010 and the access point 1020 and between the destination device 1080 and the access point 1060 were simulated based on the WLAN standard WLAN 802.11g/n. The test model assumed that 10 users share the WLAN access points. The IoT application server was defined to implement a Xeon Quad-Core Single Queue processor system. The LUNs of the storage pools were defined to implement SAS hard disks, with a speed of 15$k$ RPM and a RAID 5 (4+1) configuration. The parameters were defined as follows:

$T_{upload}=T_{Buffer\_to\_server}$
$T_{WLAN}=0.6$ msec (selected based on typical value)
$T_{AP\_to\_Server}=41$ msec (determined based on testing)
$T_{IoT\_Server}=0.004$ msec (selected based on typical value)
$T_{LUN\_write}=11$ msec (determined based on testing on VNX (Pool with SAS disks-RAID 5 "4+1")
$T_{read}=0.25*T_{Write}$ (due to RAID 5 penalty)
$T_{LUN\_read}=3$ msec (determined based on testing on VNX (Pool with SAS disks RAID 5 "4+1")
$T_{Copy}=T_{LUN\_write}+T_{LUN\_read}$   $T_{notfication}=(T_{WLAN}+T_{AP\_to\_Server}+T_{IoT\_server})*66/1526$
$T_{ack}=T_{AP\_to\_Server}*66/1526$ (based on Ethernet frame structure).

The parameter $T_{WLAN}$ denotes a WLAN frame delay from a source device to a WLAN access point. $T_{AP-Server}$ denotes an IP network delay from a WLAN access point to the IoT application server. $T_{IoT\_Server}$ denotes an IoT server processing delay. $T_{LUN\_Write}$ denotes a write delay to a LUN of the IoT cloud data storage system. $T_{LUN\_Read}$ denotes a read delay to a LUN of the IoT cloud data storage system. $T_{Copy}$ denotes a copy delay from a source LUN to a destination LUN. $T_{Notification}$ denotes a notification message delay from the IoT application server to the destination device. $T_{ack}$ denoted an acknowledgement delay.

FIGS. 11, 12, 13, 14, and 15 are bar graphs of the computer simulation results obtained using MATLAB, which show differences between an average upload delay obtained using a conventional process for sending large data files between IoT devices and an average upload delay obtained using a storage path optimization process according to an embodiment of the invention, for different test cases based on the IoT network model of FIG. 10 and other predefined parameters.

Figure 11:
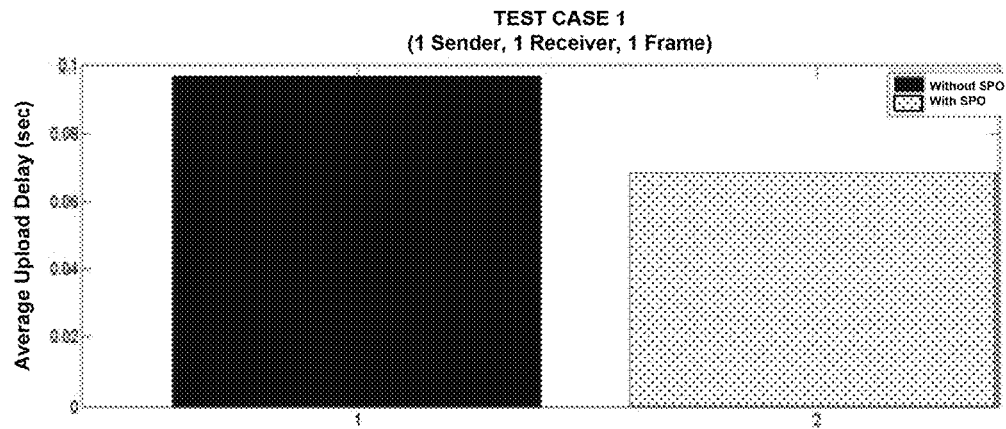
FIGS. 11, 12, 13, 14, and 15 are bar graphs of computer simulation results, which show differences between an average upload delay obtained using a conventional process for sending large data files between IoT devices and an average upload delay obtained using a storage path optimization process according to an embodiment of the invention, for different test cases based on the IoT network model of FIG. 10 and other predefined parameters.

In particular, FIG. 11 is a bar graph of computer simulation results obtained for a first test case (Test Case 1), which shows a difference between an average upload delay obtained using a conventional process for sending large data files between IoT devices and an average upload delay obtained using a storage path optimization process according to an embodiment of the invention. For the Test Case 1 (1 sender, 1 receiver, 1 frame), the total upload delay without SPO is computed as:

$$\text{TotalDelay}\_{Without} = T_{WLAN} + T_{AP\text{-}Server} + T_{IoT\_Server} + T_{LUN_{Write}} + T_{LUN_{Read}} + T_{IoT\_Server} + T_{AP\text{-}Server} + T_{WLAN};$$

and the total upload delay with SPO is computed as:

$$\text{TotalDelay}\_{With} = T_{WLAN} + T_{AP\text{-}Server} + T_{IoT\_Server} + T_{LUN\_Write} + T_{Copy} + T_{Notification}.$$

Figure 12:
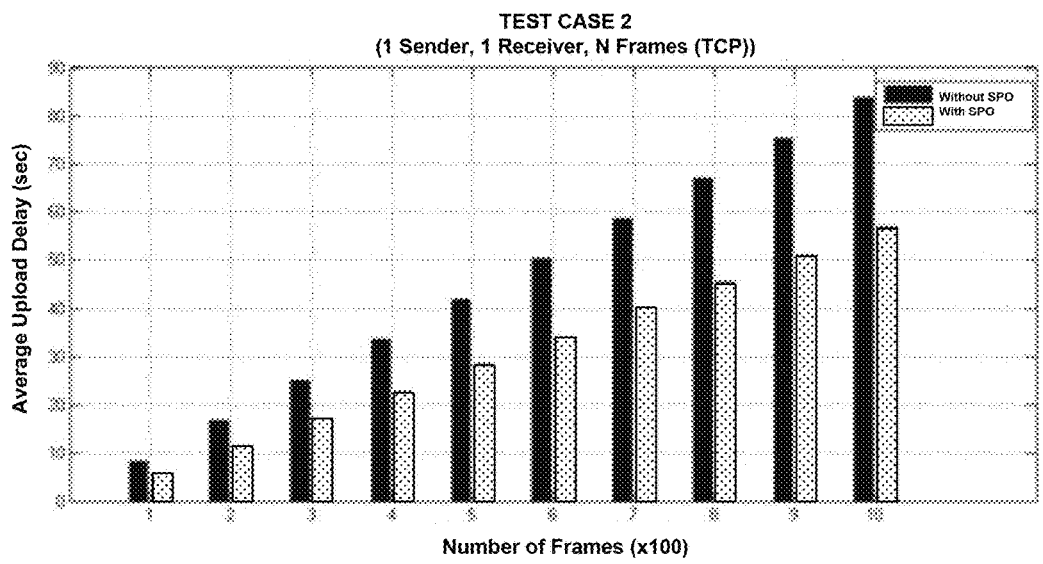

In addition, FIG. 12 is a bar graph of computer simulation results obtained for a second test case (Test Case 2), which shows a difference in an average upload delay obtained using a conventional process for sending large data files between IoT devices and a storage path optimization process according to an embodiment of the invention. For Test Case 2 (1 sender, 1 receiver, N frames (TCP)), the total upload delay without SPO is computed as:

$$\text{TotalDelay}\_{Without} = T_{WLAN} + T_{AP\_to\_Server} + (N-1)^* T_{AP\_to\_Server} + N^* T_{ack} + T_{IoT\_Server} + T_{LUN\_write} + N^* T_{AP\_to\_Server} + T_{WLAN} + N^* T_{LUN\_read};$$

and the total upload delay with SPO is computed as:

$$\text{TotalDelay}\_{With} = T_{WLAN} + T_{AP\_to\_Server} + (N-1)^* T_{AP\_to\_Server} + N^* T_{ack} + T_{IoT\_Server} + T_{LUN\_write} + N^* T_{Copy} + T_{notification}.$$

Figure 13:
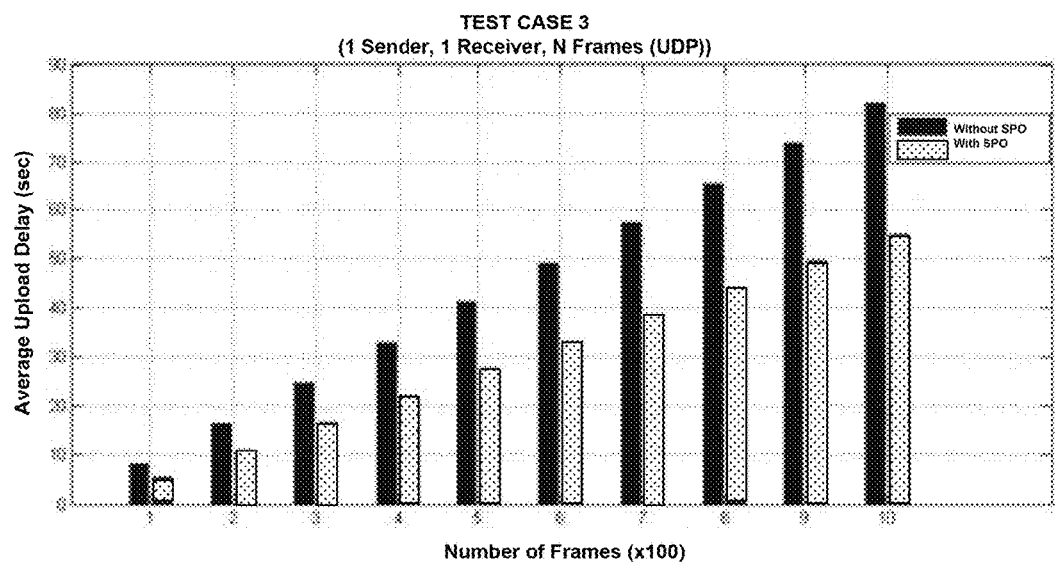

Next, FIG. 13 is a bar graph of computer simulation results obtained for a third test case (Test Case 3), which shows a difference between an average upload delay obtained using a conventional process for sending large data files between IoT devices and an average upload delay obtained using a storage path optimization process according to an embodiment of the invention. For Test Case 3 (1 sender, 1 receiver, N frames (UDP)), the total upload delay without SPO is computed as:

$$\text{TotalDelay}\_{Without} = T_{WLAN} + T_{AP\_to\_Server} + (N-1)^* T_{AP\_to\_Server} + T_{IoT\_Server} + T_{LUN\_write} + N^* T_{AP\_to\_Server} + T_{WLAN} + N^* T_{LUN\_read};$$

and the total upload delay with SPO is computed as:

$$\text{TotalDelay}\_{With} = T_{WLAN} + T_{AP\_to\_Server} + (N-1)^* T_{AP\_to\_Server} + T_{IoT\_Server} + T_{LUN\_write} + N^* T_{Copy} + T_{Notification}.$$

Figure 14:
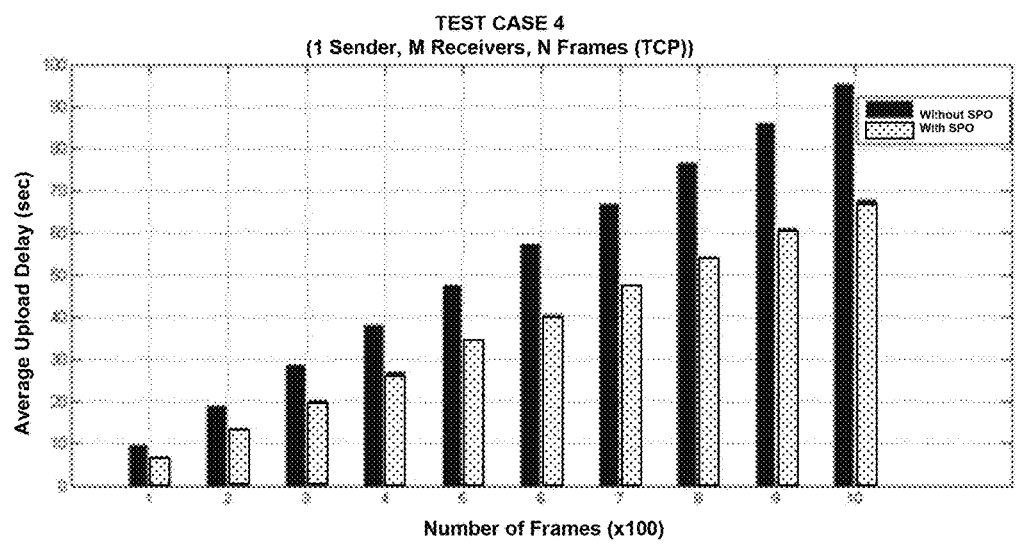

Further, FIG. 14 is a bar graph of computer simulation results obtained for a fourth test case (Test Case 4), which shows a difference between an average upload delay obtained using a conventional process for sending large data files between IoT devices and an average upload delay obtained using a storage path optimization process according to an embodiment of the invention. For Test Case 4 (1 sender, M receivers, N frames (TCP)), the total upload delay without SPO is computed as:

$$\text{TotalDelay}\_{Without} = T_{WLAN} + T\_{AP\_to\_Server} + (N-1)^* T\_{AP\_to\_Server} + N^* T\_{Ack} + T_{IoT\_Server} + N^* T\_{LUN\_write} + N^* T\_{AP\_to\_Server} + N^* T_{WLAN};$$

and the total upload time with SPO is computed as:

$$\text{TotalDelay}\_{With} = T_{WLAN} + T\_{AP\_to\_Server} + (N-1)^* T\_{AP\_to\_Server} + N^* T_{Ack} + T_{IoT\_Server} + N^* T_{LUN\_write} + N^* T_{Copy} + T_{notification}.$$

Figure 15:
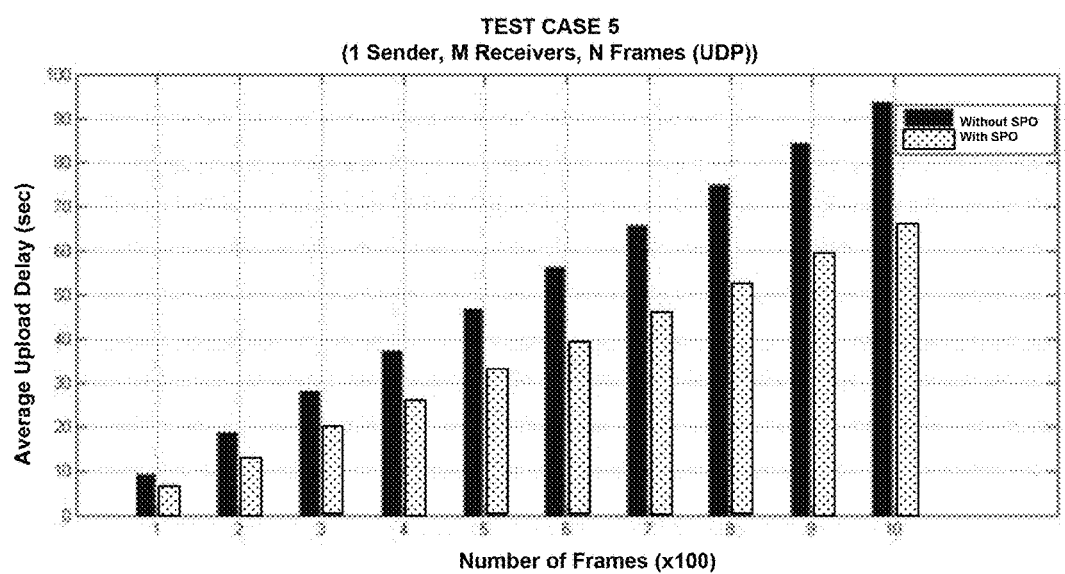

Finally, FIG. 15 is a bar graph of computer simulation results obtained for a fifth test case (Test Case 5), which shows a difference between an average upload delay obtained using a conventional process for sending large data files between IoT devices and an average upload delay obtained using a storage path optimization process according to an embodiment of the invention. For Test Case 5 (1 sender, M receivers, N frames (UDP)), the total upload delay without SPO is computed as:

$$\text{TotalDelay}\_{Without} = T_{WLAN} + T_{AP\_to\_Server} + (N-1)^* T_{AP\_to\_Server} + T_{IoT\_Server} + N^* T_{LUN\_Write} + N^* T_{AP\_to\_Server} + N^* T_{WLAN};$$

and the total upload time with SPO is computed as:

$$\text{TotalDelay}\_{With} = T_{WLAN} + T_{AP\_to\_Server} + (N-1)^* T\_{AP\_to\_Server} + T_{IoT\_Server} + N^* T_{LUN\_write} + N^* T_{Copy} + T_{Notification}.$$

The test results shown in FIGS. 11, 12, 13, 14 and 15 collectively demonstrate that SPO processes according to embodiments of the invention provide lower average upload delays as compared to a conventional process for sending large data files between IoT devices which does not implement an SPO process. Moreover, the test results shown in FIGS. 12, 13, 14 and 15 demonstrate that for each of the test cases with multiple frames, the difference in the average upload delay time between an SPO process and a conventional process increases as the number of frames and receivers increases, i.e., the improvement in upload time is proportional to an increase in the number of receivers and frames.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    executing a data processing platform on one or more computing nodes of a cloud network, wherein the data processing platform comprises (i) one or more processing nodes to process data received by a plurality of computing devices that are network connected to the data processing platform over a communications network, and (ii) a distributed data storage system to store data associated with the computing devices;
    performing a registration process by the data processing platform, wherein the registration process comprises:
        receiving a request from a user to register a first device and a second device;
        assigning unique network IDs to the first and second devices;
        allocating at least one storage pool in the distributed data storage system to store data associated with devices registered by the user including the first and second devices of the user; and storing information with regard to the user, the first and second devices, and the at least one allocated storage pool, in a database; and executing an automated process by the data processing platform, wherein the automated process comprises:
receiving a data block from the first device over the communications network, wherein the data block is specified by the first device to be sent to the second device located on the communications network;
determining whether a size of the data block received from the first device exceeds a predefined size threshold;
responsive to a determination that the size of the data block exceeds the predetermined size threshold,
accessing the distributed data storage system to store the data block in a first datastore in the at least one allocated storage pool for the first device, and to store a copy of the data block in a second datastore in the at least one allocated storage pool for the second device, wherein information in the database is accessed to determine locations of the first and second datastores in the at least one allocated storage pool for the first and second devices; and
sending a notification message to the second device over the communications network to notify the second device that the data block is stored in the second datastore and available for access by the second device; and
responsive to a determination that the size of the data block does not exceed the predetermined size threshold, sending the data block directly to the second device over the communications network.

2. The method of claim 1, wherein the first datastore and the second datastore are located within a same storage pool of the distributed data storage system.

3. The method of claim 1, wherein accessing the distributed data storage system to store the data block in the first datastore in the at least one storage pool allocated to the first device, and to store the copy of the data block in the second datastore in the at least one storage pool allocated to the second device comprises:
determining a first network ID associated with the first device and a second network ID associated with the second device;
utilizing the first network ID to identify the first datastore as being associated with the first device; and
utilizing the second network ID to identify the second datastore as being associated with the second device.

4. The method of claim 3, wherein the first datastore and the second datastore comprise one of (i) different LUNs (logical unit numbers) of a same storage pool and (ii) different LUNs of different storage pools.

5. The method of claim 1, further comprising allocating at least one virtual machine or server to the first and second devices, wherein a same virtual machine or server is allocated to the first and second devices when the first and second devices are of a same application type.

6. The method of claim 1, wherein the data processing platform comprises an Internet-of-Things cloud computing system.

7. An article of manufacture comprising a non-transitory processor-readable storage medium having stored therein program code of one or more software programs, wherein the program code is executable by one or more processors to implement a method which comprises:
executing a data processing platform on one or more computing nodes of a cloud network, wherein the data processing platform comprises (i) one or more processing nodes to process data received by a plurality of computing devices that are network connected to the data processing platform over a communications network, and (ii) a distributed data storage system to store data associated with the computing devices;
performing a registration process by the data processing platform, wherein the registration process comprises:
receiving a request from a user to register a first device and a second device;
assigning unique network IDs to the first and second devices;
allocating at least one storage pool in the distributed data storage system to store data associated with devices registered by the user including the first and second devices of the user; and
storing information with regard to the user, the first and second devices, and the at least one allocated storage pool, in a database; and
executing an automated process by the data processing platform, wherein the automated process comprises:
receiving a data block from the first device over the communications network, wherein the data block is specified by the first device to be sent to the second device located on the communications network;
determining whether a size of the data block received from the first device exceeds a predefined size threshold;
responsive to a determination that the size of the data block exceeds the predetermined size threshold,
accessing the distributed data storage system to store the data block in a first datastore in the at least one allocated storage pool for the first device, and to store a copy of the data block in a second datastore in the at least one allocated storage pool for the second device, wherein information in the database is accessed to determine locations of the first and second datastores in the at least one allocated storage pool for the first and second devices; and
sending a notification message to the second device over the communications network to notify the second device that the data block is stored in the second datastore and available for access by the second device; and
responsive to a determination that the size of the data block does not exceed the predetermined size threshold, sending the data block directly to the second device over the communications network.

8. The article of manufacture of claim 7, wherein the program code to access the distributed data storage system to store the data block in the first datastore in the at least one allocated storage pool for the first device, and to store the copy of the data block in the second datastore in the at least one allocated storage pool for the second device, further comprises program code that is executable by the one or more processors to:
determine a first network ID associated with the first device and a second network ID associated with the second device;
utilize the first network ID to identify the first datastore as being associated with the first device; and
utilize the second network ID to identify the second datastore as being associated with the second device.

9. The article of manufacture of claim 8, wherein the first datastore and the second datastore comprise one of (i) different LUNs (logical unit numbers) of a same storage pool and (ii) different LUNs of different storage pools.

10. The article of manufacture of claim 7, wherein the program code is further executable by the one or more processors to allocate at least one virtual machine or server to the first and second devices, wherein a same virtual machine or server is allocated to the first and second devices when the first and second devices are of a same application type.

11. A system, comprising:
a data processing platform executing on one or more computing nodes of a cloud network, wherein the data processing platform comprises (i) one or more processing nodes to process data received by a plurality of computing devices that are network connected to the data processing platform over a communications network, and (ii) a distributed data storage system to store data associated with the computing devices;
wherein the data processing platform is configured to perform a registration process, wherein the registration process comprises:
receiving a request from a user to register a first device and a second device;
assigning unique network IDs to the first and second devices;
allocating at least one storage pool in the distributed data storage system to store data associated with devices registered by the user including the first and second devices of the user; and
storing information with regard to the user, the first and second devices, and the at least one allocated storage pool, in a database; and
wherein the data processing platform is configured to perform an automated process, wherein the automated process comprises:
receiving a data block from the first device over the communications network, wherein the data block is specified by the first device to be sent to the second device located on the communications network;
determining whether a size of the data block received from the first device exceeds a predefined size threshold;
responsive to a determination that the size of the data block exceeds the predetermined size threshold,
accessing the distributed data storage system to store the data block in a first datastore in the at least one allocated storage pool for the first device, and to store a copy of the data block in a second datastore in the at least one allocated storage pool for the second device, wherein information in the database is accessed to determine locations of the first and second datastores in the at least one allocated storage pool for the first and second devices; and
sending a notification message to the second device over the communications network to notify the second device that the data block is stored in the second datastore and available for access by the second device; and
responsive to a determination that the size of the data block does not exceed the predetermined size threshold, sending the data block directly to the second device over the communications network.

12. The system of claim 11, wherein the data processing platform is further configured to:
determine a first network ID associated with the first device and a second network ID associated with the second device;
utilize the first network ID to identify the first datastore as being associated with the first device; and
utilize the second network ID to identify the second datastore as being associated with the second device.

13. The system of claim 11, wherein the data processing platform comprises an Internet-of-Things cloud computing system, and wherein the distributed data storage system comprises a SAN (storage area network) storage array.

14. The system of claim 11, wherein the first datastore and the second datastore are located within a same storage pool of the distributed data storage system.

15. The system of 12, wherein the first datastore and the second datastore comprise one of (i) different LUNs (logical unit numbers) of a same storage pool and (ii) different LUNs of different storage pools.

16. The system of claim 11, wherein the data processing platform is further configured to allocate at least one virtual machine or server to the first and second devices, wherein a same virtual machine or server is allocated to the first and second devices when the first and second devices are of a same application type.

17. The system of claim 11, wherein the data processing platform is further configured to perform an automated process which comprises:
receiving a request from the first device to send a data block, which is stored in the first datastore in the at least one allocated storage pool for the first device, to the second device;
accessing the data block from the first datastore;
determining whether a size of the accessed data block exceeds a predefined size threshold;
responsive to a determination that the size of the data block does not exceed the predetermined size threshold, sending the accessed data block directly to the first device over the communications network to allow the first device to send the accessed data block to the second device; and
responsive to a determination that the size of the data block exceeds the predetermined size threshold,
storing a copy of the accessed data block in the second datastore in the at least one allocated storage pool for the second device; and
sending a notification message to the second device over the communications network to notify the second device that the accessed data block is stored in the second datastore and available for access by the second device.

18. The method of claim 1, wherein executing an automated process by the data processing platform further comprise:
receiving a request from the first device to send a data block, which is stored in the first datastore in the at least one allocated storage pool for the first device, to the second device;
accessing the data block from the first datastore;
determining whether a size of the accessed data block exceeds a predefined size threshold;
responsive to a determination that the size of the data block does not exceed the predetermined size threshold, sending the accessed data block directly to the first device over the communications network to allow the first device to send the accessed data block to the second device; and
responsive to a determination that the size of the data block exceeds the predetermined size threshold,
storing a copy of the accessed data block in the second datastore in the at least one allocated storage pool for the second device; and sending a notification message to the second device over the communications network to notify the second device that the accessed data block is stored in the second datastore and available for access by the second device.

19. The article of manufacture of claim 7, wherein executing the automated process by the data processing platform, further comprises:

receiving a request from the first device to send a data block, which is stored in the first datastore in the at least one allocated storage pool for the first device, to the second device;

accessing the data block from the first datastore;

determining whether a size of the accessed data block exceeds a predefined size threshold;

responsive to a determination that the size of the data block does not exceed the predetermined size threshold, sending the accessed data block directly to the first device over the communications network to allow the first device to send the accessed data block to the second device; and responsive to a determination that the size of the data block exceeds the predetermined size threshold, storing a copy of the accessed data block in the second datastore in the at least one allocated storage pool for the second device; and sending a notification message to the second device over the communications network to notify the second device that the accessed data block is stored in the second datastore and available for access by the second device.

* * * * *